A. LEONARD.
WORKMAN'S COLLAPSIBLE TRESTLE OR TABLE.
APPLICATION FILED JULY 23, 1918.
1,312,994.
Patented Aug. 12, 1919.
2 SHEETS—SHEET 2.
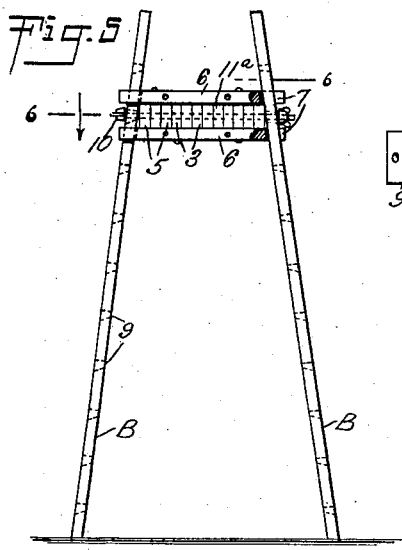
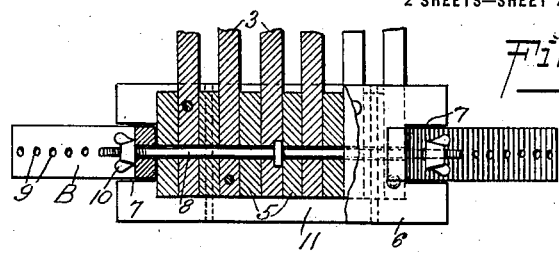
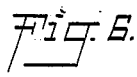
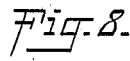
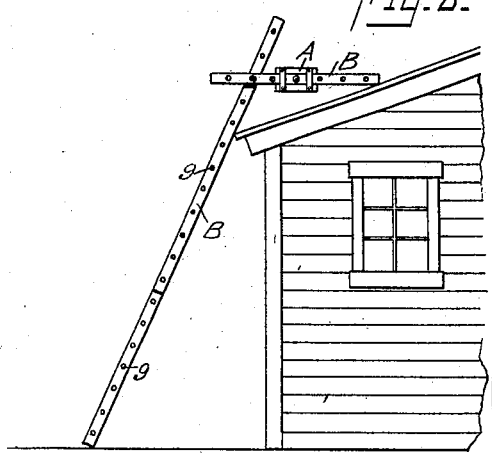
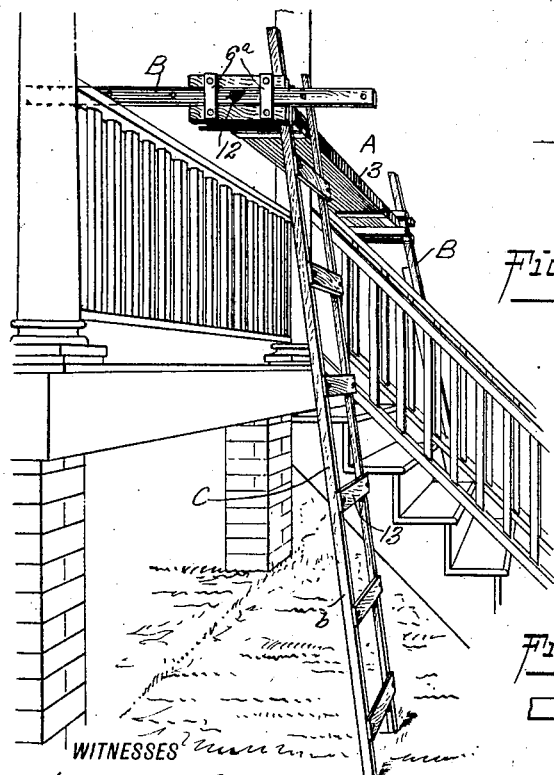
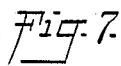
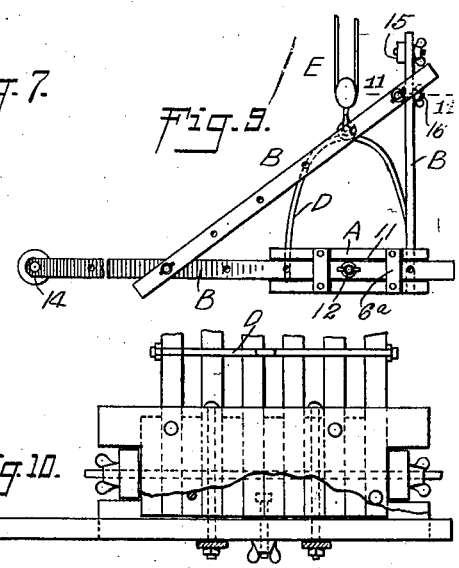
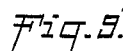
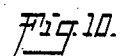
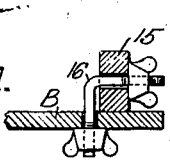
WITNESSES
William P. Goeler
C. Bradway
INVENTOR
Alvin Leonard
BY Munn & Co
ATTORNEYS

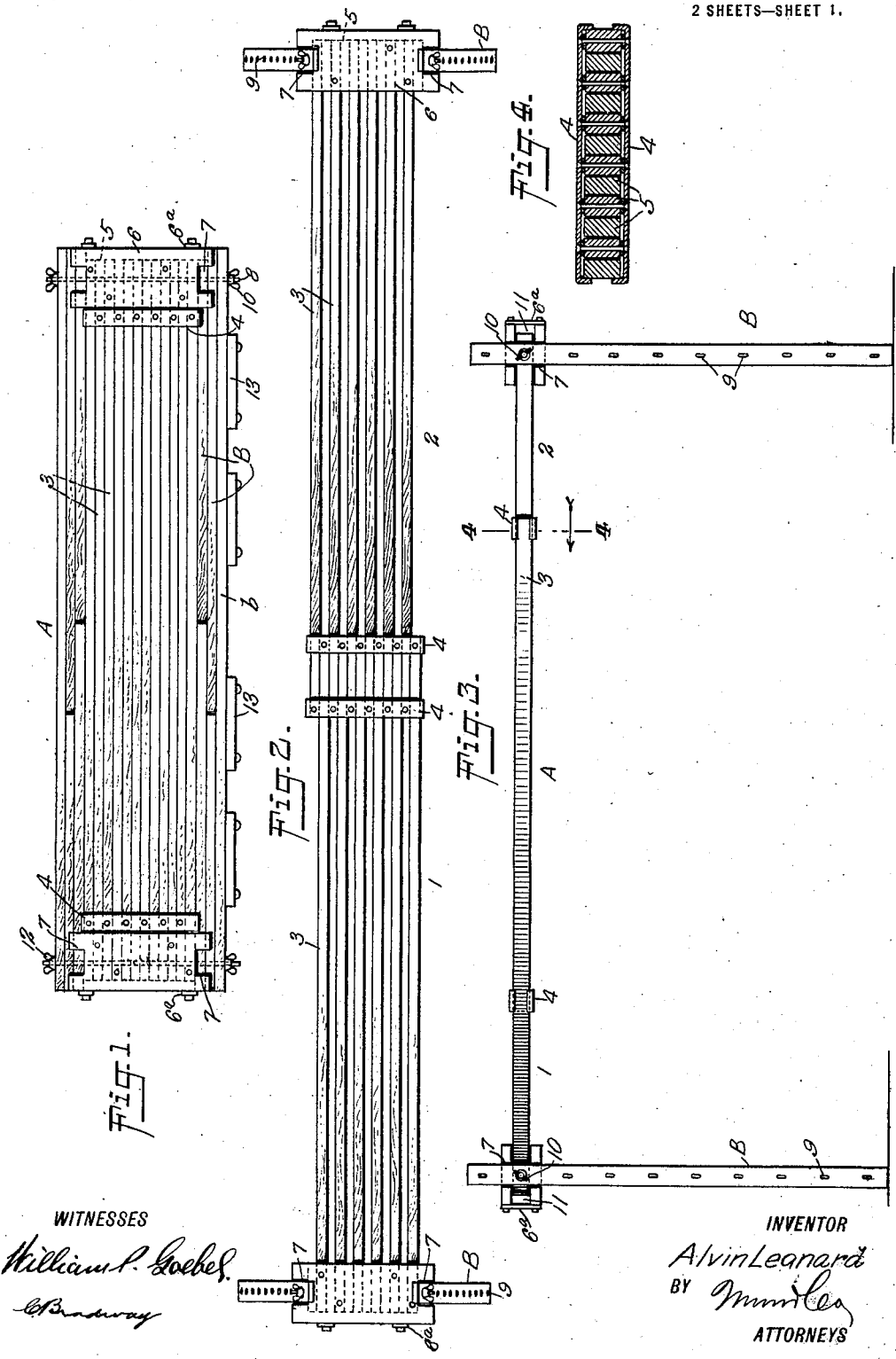

UNITED STATES PATENT OFFICE.

ALVIN LEONARD, OF CARBONDALE, PENNSYLVANIA.

WORKMAN'S COLLAPSIBLE TRESTLE OR TABLE.

1,312,994. Specification of Letters Patent. Patented Aug. 12, 1919.

Application filed July 23, 1918. Serial No. 246,378.

*To all whom it may concern:*

Be it known that I, ALVIN LEONARD, a citizen of the United States, and a resident of Carbondale, in the county of Lackawanna and State of Pennsylvania, have invented a new and Improved Workman's Collapsible Trestle or Table, of which the following is a full, clear, and exact description.

This invention relates to a foldable or collapsible trestle adapted to be used by paperhangers, painters, carpenters and the like, and the invention has for its general object to provide a device of this character which is easily and quickly adaptable for a great variety of uses and which when not in use can be folded into a small space so as to be conveniently handled, carried or shipped.

A more specific object of the invention is the provision of an extensible trestle body which has simple, novel and effective means for detachably fastening legs thereto, the said means also serving as devices for holding the legs when the trestle is packed for shipment, or for holding the leg members in position to form braces or arms in certain uses of the trestle body.

Another object of the invention is to provide a trestle which has extensible legs adjustably connected therewith whereby the trestle can be supported on uneven ground or steps without the necessity of the legs being tied together, since they are clamped to the body in downwardly diverging relation, so that the trestle will have a wide supporting base.

With such objects in view, and others which will appear as the description proceeds, the invention comprises various novel features of construction and arrangement of parts which will be set forth with particularity in the following description and claims appended hereto.

In the accompanying drawings which illustrate certain embodiments of the invention and wherein similar characters of reference indicate corresponding parts in all the views, Figure 1 is a plan view of the device when completely packed;

Fig. 2 is a plan view of the trestle set up and extended;

Fig. 3 is a side view of the trestle less extended than in Fig. 2;

Fig. 4 is a detail sectional view on the line 4—4, Fig. 3;

Fig. 5 is an end view of the trestle;

Fig. 6 is an enlarged plan view of one end of the trestle partially in section;

Fig. 7 is a perspective view of the device set up for use in painting or working on porch cornices;

Fig. 8 is a view showing the device as a roof scaffold;

Fig. 9 is an end view showing the device as a painter's swing bridge;

Fig. 10 is a plan view of the end portion of the device used as in Fig. 9;

Fig. 11 is a detail sectional view on the line 11—11, Fig. 9.

The device comprises a body A which is made up of two sections 1 and 2, with each section formed of a plurality of slats 3 which are spaced apart so that the slats will slidably interfit, whereby the body can be lengthened or shortened by relative longitudinal movement of the sections 1 and 2. The slats are set so that their edges are at the top and bottom, and the inner ends of the slats 3 of each section are tied together in spaced relation by upper and lower metal straps 4 which serve to prevent the sections from pulling apart. The slats at the outer ends are held in spaced relation by interposed spacing blocks 5, and on the top and bottom of the slats at the outer end of each section are plates 6 of wood which are long enough that the ends project beyond the outermost slats of each section for the purpose of forming pockets or recesses to receive the legs B of the trestle when the device is folded and not in use. The projecting ends of the plates 6 have recesses 7, the recesses of the upper plates 6 being deeper than the recesses in the lower plates. This is for the purpose of causing the legs B, when in set-up position, to flare or diverge downwardly, as shown in Fig. 5. The legs are held in the recesses 7 by means of a bolt rod 8 which passes through all the slats 3 of the section and spacer blocks and also through the legs B, which latter have a plurality of bolt-receiving apertures 9 so that the legs can be independently lengthened or shortened, and on the ends of the bolt rod are wing nuts 10 for permitting the legs to be attached or detached without the use of tools.

The outer ends of the sections are so designed as to receive laterally extending arms, brace members or the like. For this purpose the edges of the plates 6 extend outwardly beyond the ends of the slats so as to form horizontal recesses 11 of such proportions as to receive a leg B, which may be used as an arm or brace member. Vertical straps or keepers 6ª fastened to the edges of the plates 6 coöperate with the plates and ends of the slats to hold the leg member in place, but additional securing means is provided in the form of a bolt 12 which is anchored in the end of the body A and is adapted to pass through any one of the apertures in the leg member, and on the bolt is a wing nut to hold the leg member rigidly with respect to the bolt.

The complete device is shown in Fig. 1 in folded condition, and in addition to the two sections of the body formed by the slats 3, a plurality of pairs of leg members B are included, these being held in place by the projecting ends of the plates 6 and the bolts 8, and in addition long leg members $b$ are provided which extend the full length of the device when in contracted condition, and these members are held by the bolts 8. These long members may be used as the sides of a ladder, the rungs of which are formed by short strips 13 removably bolted to one of the ladder members or long legs $b$.

In Figs. 2, 3 and 5 the device is shown set up as a trestle or work table, while in Fig. 7 the body A is supported at one end by a ladder C formed by the members $b$ and rung strips 13, and at the same end is fastened a short leg member B to function as a bracket or steadying arm. At the opposite end the body A is supported on inclined leg members B. In Fig. 8 the device is shown as a scaffold for working on a roof, and in this case the frame structure of the scaffold is made up of leg members B bolted together, one set of leg members resting on the ground and the other set, which is connected with the first-mentioned set, resting on the roof, and on the latter set is attached the body A.

In Fig. 9, which shows a painter's swing bridge, the body A is supported on hangers D having the block and tackle devices E, and on the ends of the body are hold-off arms formed by leg members B, and on the end of each arm is a roller 14 to run on the wall of a building and steady the bridge therefrom. The bridge has a protecting rail 15 supported on upright leg members B, and the rail is braced by inclined leg members B extending from the horizontal hold-off arms to the uprights of the rail. The uprights of the rail and brace members are fastened together by an angle bolt 16, as shown in Fig. 11.

The ladder in Fig. 7 is made up by attaching the rungs to one of the supporting legs of the trestle and one of the additional members, so that the ladder is part of the trestle and is movable with it.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A device of the class described comprising a body member, upper and lower plates fastened to the ends of the body member and the edges of the plates projecting beyond the ends of the member, members removably set in the recesses formed between the projecting edges of the plates, and straps secured to the edges of the plates and extending across the recesses to form keepers for the last-mentioned members.

2. A device of the class described comprising a body having spaced lateral projections at the ends thereof, leg members adapted to lie parallel with one side of the body and to engage between the projections, and means for fastening the leg members in such position.

3. A device of the class described comprising a body having spaced lateral projections at the ends thereof, leg members adapted to lie parallel with one side of the body and to engage between the projections, means for fastening the leg members in such position, ladder members secured by the said means to the body when the device is folded, and rungs carried by a ladder member.

4. A device of the class described comprising a body formed of two sections each comprising a plurality of slats, the slats of one section being alternated with the slats of the other section and the said sections being slidable longitudinally one into the other, spacing blocks at the outer ends of the slats, bolts passing through the slats and spacing blocks, and detachable legs fastened to the body on the aforesaid bolts.

5. A device of the class described comprising a body formed of two sections each comprising a plurality of slats, the slats of one section being alternated with the slats of the other section and the said sections being slidable longitudinally one into the other, spacing blocks at the outer ends of the slats, bolts passing through the slats and spacing blocks, detachable legs fastened to the body, on the bolts, and transverse plates secured to the outer ends of the sections, said plates having open notches in their outer edges, and into which notches the leg members fit.

ALVIN L. LEONARD.

Copies of this patent may be obtained for five cents each, by addressing the "Commissioner of Patents, Washington, D. C."